Patented Feb. 26, 1952

2,586,849

UNITED STATES PATENT OFFICE 2,586,849

2-ISOPROPYLMETHYLAMINOETHYL ESTER OF PHENYLCYCLOHEXENYLACETIC ACID AND SALTS THEREOF

Robert Bruce Moffett, Kalamazoo, Mich., assignor to The Upjohn Company, Kalamazoo, Mich., a corporation of Michigan No Drawing. Application May 18, 1950, Serial No. 162,809

3 Claims. (Cl. 260—472)

This invention relates to new compositions of matter which are of value as therapeutic agents, particularly as antispasmodics. More specifically the products of this invention are members of the group consisting of a compound represented by the formula:

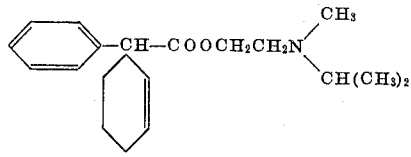

and acid addition salts thereof.

The free basic ester is a colorless, viscous liquid which boils at 123 degrees centigrade at a pressure of 0.01 mm. of mercury. It is readily soluble in the common organic solvents, but is insoluble in water. With acids it reacts to form acid addition salts, most of which are solid crystalline compounds soluble in water. Among the acids suitable for this purpose are inorganic acids such as the hydrogen halides, sulfuric and phosphoric, and organic acids such as acetic, benzoic, citric, tartaric and succinic. Because of the water solubility of the salts it is more convenient to use them instead of the free base. The compounds of this invention are neurotropic antispasmodic agents of a high order of activity, that is, they act upon nonstriated muscle tissues to relieve spasm induced by the autonomic nervous system and in this respect their action resembles that of atropine.

The 2 - isopropylmethylaminoethyl phenyl-delta-2-cyclohexenylacetate of this invention can be prepared by condensing the acid chloride of phenyl-delta-2-cyclohexenylacetic acid with isopropylmethylaminoethanol or by condensing a suitable salt of the acid with a halide of isopropylmethylaminoethanol in a suitable solvent such as benzene, isopropanol, or isopropyl ether. Other methods which are known for the preparation of esters can also be employed. The product can be isolated as the free basic ester or it can be converted to a water-soluble acid addition salt, which is more convenient to use, by treatment with an appropriate acid.

Preparation.—Isopropylmethylaminoethanol

To 512 grams of 90% formic acid (10 moles) was added slowly with cooling 206 grams (2 moles) of isopropylaminoethanol (Hancock and Cope, Org. Syntheses, 26, 38 (1946)) followed by 325 ml. of 37% aqueous formaldehyde. The mixture was heated until carbon dioxide was evolved rapidly and then the source of heat was removed. When the evolution had subsided, the reaction mixture was heated to about 80–90 degrees centigrade for six to eight hours, treated with 1000 ml. of about 4 N hydrochloric acid and concentrated under reduced pressure. To the viscous residue was added 650 ml. of water and 500 ml. of about 18 N sodium hydroxide, the organic layer separated, and the aqueous layer extracted with four 100 ml. portions of benzene. The organic layer and the extracts of the aqueous layer were combined, dried over anhydrous potassium carbonate and the benzene was removed by distillation under slightly reduced pressure. Distillation of the residue under reduced pressure gave 141.5 grams (60.5%) of isopropylmethylaminoethanol boiling at 69 degrees centigrade at a pressure of 23 mm. of mercury; refractive index, $n_D^{25}=1.4379$.

*Analysis.*—Calcd. for $C_6H_{15}NO$: N, 11.95. Found: N, 11.89.

Example.—2-isopropylmethylaminoethyl phenyl-delta-2-cyclohexenylacetate

To a solution of 11.8 grams (0.05 mole) of phenyl - delta - 2 - cyclohexenylacetyl chloride (Kolloff, Hunter, Woodruff and Moffett, J. Am. Chem. Soc., 71, 3988 (1949)) in 10 ml. of dry benzene was added a solution of 7.0 grams (0.06 mole) of isopropylmethylaminoethanol in 15 ml. of dry benzene. After standing for one-half hour the mixture was heated under reflux for one hour and cooled. Ice water containing a small amount of hydrochloric acid was added, the benzene layer separated, and the aqueous layer extracted twice with ether. After separation the aqueous layer was made basic with sodium hydroxide solution and extracted twice with ether. The extracts were combined, washed twice with water, saturated sodium chloride solution, and dried over anhydrous sodium sulfate. After removal of the ether, distillation of the residual oil under reduced pressure gave 12.5 grams (79%) of 2-isopropylmethylaminoethyl phenyl-delta-2-cyclohexenylacetate as a colorless liquid distilling at 123 degrees centigrade at a pressure of 0.01 mm. of mercury; refractive index, $n_D^{25}=1.5140$.

*Analysis.*—Calcd. for $C_{20}H_{29}NO_2$: N, 4.44. Found: N, 4.46.

By passing a slight excess of gaseous hydrogen chloride into a solution of 11.9 grams of the above free base in 300 ml. of dry ether the hydrochloride was formed and separated as an oil which soon solidified. Crystallization of the solid from ethyl acetate gave 8.7 grams of 2-isopropylmethylaminoethyl phenyl-delta-2-cyclohexenylacetate hydrochloride melting at 121–124 degrees centigrade.

*Analysis.*—Calcd. for $C_{20}H_{30}NO_2Cl$: Cl, 10.08. Found: Cl, 10.21.

In a like manner the hydrobromide is obtained. By adding an alcoholic solution of sulfuric, phosphoric, citric or other suitable acid to a solution of the base in a suitable solvent, the sulfate, phosphate, citrate or other salt of the base is formed which can be isolated by the addition of ether or by other known methods.

Although the foregoing specification comprises preferred embodiments of the invention, it is to be understood that the invention is not limited to the exact details shown and described, and that variations and modifications may be made without departing from the scope of the invention as defined in the appended claims.

I claim:
1. A member of the group consisting of a compound having the formula:

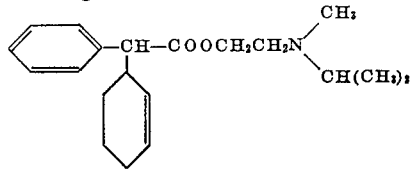

and acid addition salts thereof.

2. 2-isopropylmethylaminoethyl phenyl-delta-2-cyclohexenylacetate.

3. 2-isopropylmethylaminoethyl phenyl-delta-2-cyclohexenylacetate hydrochloride.

ROBERT BRUCE MOFFETT.

REFERENCES CITED

The following references are of record in the file of this patent:

Meier et al.: Helv. Medica Acta 7, 111 (1940–41).